UNITED STATES PATENT OFFICE.

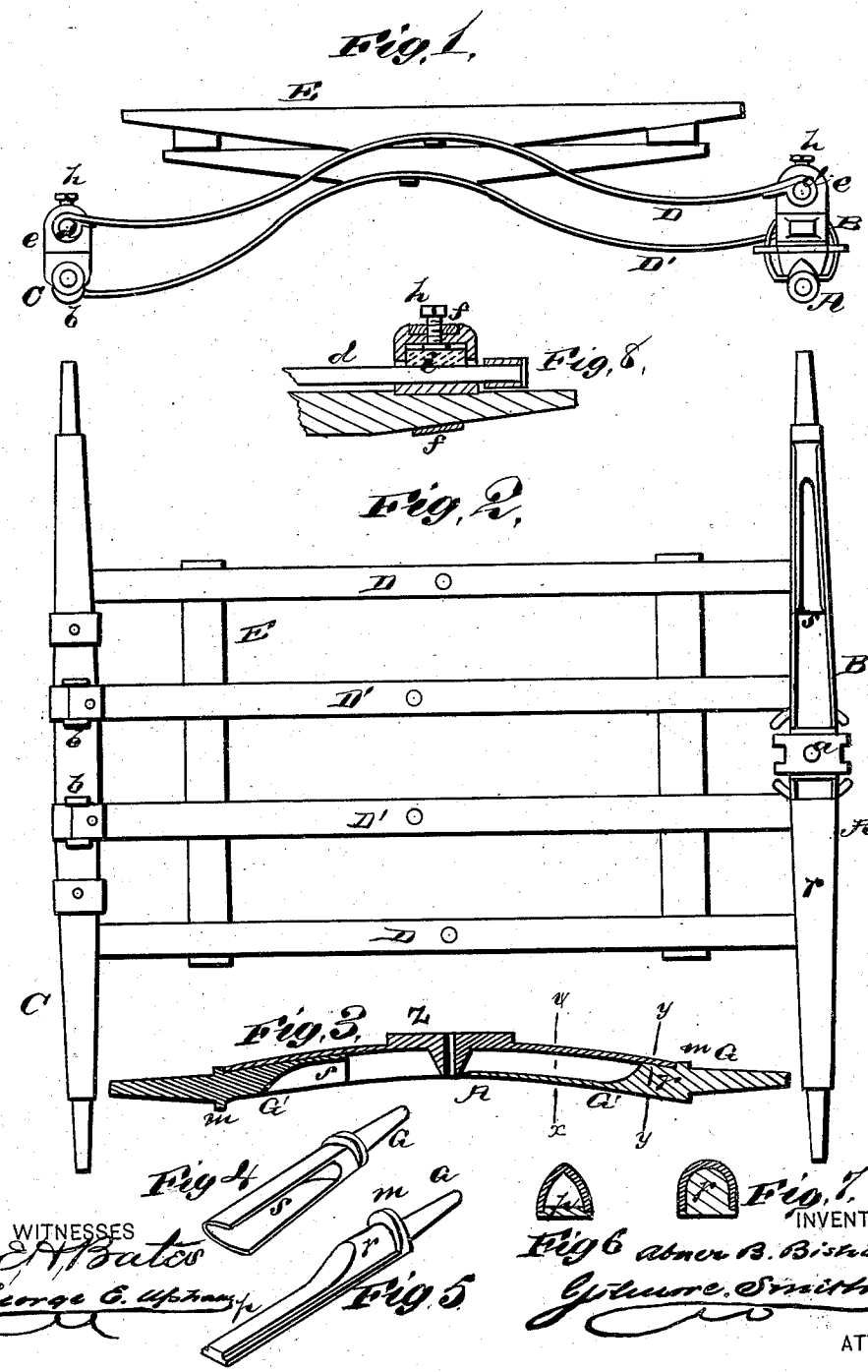

ABNER B. BISHOP, OF MEDINA, OHIO.

IMPROVEMENT IN VEHICLE-SPRINGS.

Specification forming part of Letters Patent No. 192,969, dated July 10, 1877; application filed April 14, 1877.

*To all whom it may concern:*

Be it known that I, ABNER B. BISHOP, of Medina, in the county of Medina and State of Ohio, have invented a new and valuable Improvement in Running-Gear and Axles for Wagons; and I do hereby declare that the following is a full, clear, and exact description of the construction and operation of the same, reference being had to the annexed drawings, making a part of this specification, and to the letters and figures of reference marked thereon.

Figure 1 of the drawings is a representation of an end view of my improved running-gear and axle for wagons. Fig. 2 is a plan view of the same. Fig. 3 is a longitudinal vertical section; and Figs. 4, 5, 6, 7 are detail, perspective, and sectional views of axles; and Fig. 8 is a sectional detail.

The nature of my invention consists in the construction and arrangement in running-gears for vehicles, as will be hereinafter more fully set forth.

In the annexed drawing, which fully illustrates my invention, A represents the front axle; B, the bolster thereon, united by the king-bolt *a*. C is the hind axle.

The bolster B and hind axle C are connected by means of four curved springs, D D and D' D', upon which the bed E is supported.

The two center springs D' D' are connected to clips *b b* under the hind axle C, and their front ends made fast in recesses in the under side of the bolster B. The side springs D D are placed upon the ends of rods *d d*, which are located on top of the bolster and hind axle. Each rod *d* is placed in boxes *e e*, held to place by clips *f f*, and through the top of each box is passed a set-screw, *h*, which bears on a rubber block, *i*, on top of the rod in the box. By turning down these set-screws the rods may be tightened to compensate for all wear in the boxes, whether of the boxes or the rod itself.

The axle A will be made of steel or iron pressed in the shape of the axle and axle-bed now in use—that is to say, it will be made entirely of steel or iron without any attachment of wood on top; and it is made hollow from underneath, whereby it is made much lighter, and, nevertheless, much stronger, than the ordinary axles now in use.

The axle A is provided on its upper surface with an enlarged flat surface, *z*, with an opening for the king-lock, which forms the lower half of the fifth-wheel.

G G represent the spindles, which are provided with spindle-arms G' G', constructed of such form as to fit within the axle A. At the inner end of the spindle G is a flange or collar, *m*, to come close up to the end of the axle, and beyond said collar inward for a suitable distance the spindle-arm G' is made solid, as shown at *r*, and for the remainder of its length it may simply form a plate, as shown at *p* in Fig. 5, to constitute a bottom for the hollow axle underneath; or it may be made of the same general shape as the hollow axle, and also itself hollow, as shown at *s* in Fig. 3.

These spindle-arms are fastened and held in the axle by clips or any other suitable means.

What I claim as new, and desire to secure by Letters Patent, is—

The combination, with the bolster B and rear axle C, of the two center springs D' D', attached to the under sides thereof, the two side springs D D, attached to the rods *d d* on top of the bolster and rear axle, the boxes *e e*, set-screws *h h*, and rubbers *i i*, substantially as shown and described.

In testimony that I claim the above I have hereunto subscribed my name in the presence of two witnesses.

ABNER B. BISHOP.

Witnesses:
B. F. WHIPPLE,
WM. H. ALDEN.